United States Patent [19]
Finn et al.

[11] 3,721,622
[45] March 20, 1973

[54] PROCESS FOR THE BIO-OXIDATION OF NITROGEN DEFICIENT WASTE MATERIALS

[76] Inventors: Robert K. Finn, 107 Oakwood Lane; Alex L. Tannahill, 305 Tareyton Drive, both of Ithaca, N.Y. 14850

[22] Filed: March 10, 1972

[21] Appl. No.: 233,784

[52] U.S. Cl. ................ 210/11, 195/42, 210/15, 210/54
[51] Int. Cl. .................................. C02c 1/02
[58] Field of Search ................ 210/11, 15, 3-8, 210/54; 195/42, 47, 48, 100, 101, 102

[56] References Cited

UNITED STATES PATENTS

| | | | |
|---|---|---|---|
| 2,897,148 | 7/1959 | Laboureur | 210/11 |
| 1,392,211 | 9/1921 | Peck | 210/11 X |
| 2,982,698 | 5/1961 | Platt | 195/102 X |
| 3,356,609 | 12/1967 | Bruemmer | 210/11 X |

*Primary Examiner*—Michael Rogers
*Attorney*—Edward S. Irons

[57] ABSTRACT

Nitrogen deficient waste is biooxidized from about 3 to about 12 hours in an aerated zone containing an active pure or semipure culture of aerobic free living nitrogen fixing bacteria.

19 Claims, No Drawings

PROCESS FOR THE BIO-OXIDATION OF NITROGEN DEFICIENT WASTE MATERIALS

BACKGROUND OF THE INVENTION

1. Field of the Invention

The present invention relates to a process for biooxidation of nitrogen-deficient waste materials by a dispersed growth technique using aerobic, free living ntirogen fixing bacteria.

2. Description of the Prior Art

Organic waste is conventionally subjected to aerobic oxidation in activated sludge, trickling filter and similar systems. The economics of all such secondary treatment techniques are unsatisfactory by reason of the cost of disposal of the relatively large amounts of sludge formed, the long retention times and hence large settling basins required and other factors essential to satisfactory operation. Extended aeration or "aerobic digestion" is sometimes used but is also undesirably expensive. "Dispersed Growth" aeration for oxidizing organic matter in the absence of flocculent growth has also been suggested, however the amount of air required per pound of BOD removed is comparable to the activated sludge process whereas aeration periods that achieve the same BOD reduction are normally much greater. See Nemerow, N.L., "Liquid Waste of Industry," Addison-Wesley Publ. (1971) pp. 114–117.

It has also been suggested to process nitrogen-deficient wastes in activated sludge systems containing nitrogen fixing microorganisms of the genus Azotobacter. In the described practice of this process the microorganism utilized is not maintained in the system but is overgrown or displaced by filamentous bacteria. See Kaylor et al., "Atmospheric Nitrogen Fixation in Activated Sludge," Proc. 18th Indus. Waste Conf., Purdue Univ., p. 243 (1963).

BRIEF SUMMARY OF THE INVENTION

This invention resides in a novel method of treating nitrogen-deficient wastes entailing the utilization in a dispersed growth system of pure or semipure cultures of aerobic, free-living non-symbiotic, nitrogen-fixing bacteria to achieve 85 percent reductions in COD, if desired in a single step, without the necessity of clarification and sludge removal and without the formation of filamentous microorganisms.

The preferred practice of the invention entails continuous introduction of a nitrogen-deficient waste material, and such nutrients as may be appropriate to insure growth of the microorganism into an aerated zone in which an acclimated culture of a pure or semipure culture of at least one aerobic, free-living, nitrogen-fixing microoganisms is actively growing, and continuous discharge of the treated waste from said zone, the residence time in said zone being requisite to produce an effluent of substantially lower COD than the nitrogen-deficient waste originally fed into the system.

The invention provides a process for the treatment of nitrogen-deficient organic wastes which is characterized by one or more of the following advantages: (a) low cell yields to provide biomass of less than 15 percent of BOD; (b) substantially complete oxidation of nitrogen-deficient waste material to carbon dioxide and water with little or no soluble byproducts formed by the biochemical reaction; (c) short retention time as compared with activated sludge and trickling filter systems; (d) utility to process broad classes of wastes, including strong and toxic materials, e.g. phenols and materials giving undesirable tastes and odors, the residual COD appearing primarily in the biomass; (e) lower phosphorus requirements as compared with activated sludge systems; (f) operability in the absence of added nitrogen; (g) rapid growth of microorganisms as evidenced by a doubling time of about 2.5 hours in the laboratory and of about 3 to 5 hours in commercial practice; (h) absence of any requirement for "seeding" such as is practiced in the "dispersed growth" technique, and (i) operability in the absence of recycle of any portion of the culture.

DETAILED DESCRIPTION OF THE INVENTION:

The invention is generally useful to process waste materials containing monohydric and polyhydric alcohols other than methanol, e.g., ethanol, propanol, butanol, glycols, glycerol, sorbitol and mannitol; organic aliphatic and aromatic acids, other than formic and oxalic, e.g., acetic, propionic, caproic, benzoic, salicylic, lactic, maleic, succinic, fumaric, tartaric, glutonic and saccharic acid; sugars, e.g., glucose, fructose, galactose, sucrose, maltose, lactose; dextrin, starch and aromatic compounds such as phenol (after acclimatization). Typical nitrogen-deficient industrial wastes to which the invention is applicable include various of the wastes from the manufacture of paper products such as strawboard; from food processing such as fruit, sugar, corn and starchy wastes; from textile processing such as wastes from desizing operations and wastes from the chemical and petrochemical industry, including plastics manufacture. The economics and effectiveness of the process are a function of the specific waste material treated. Some waste materials embraced by these general categories may not be economically or fully treated by the process of this invention.

Nitrogen-deficient material useful in this invention is characterized by a nitrogen-BOD ratio of less than 1:20, preferably on the order of 1:30 to 1:35. Concomitantly, although some nitrogen may be present, especially if inorganic, it is important that excess nitrogen compounds not be introduced, thus precluding the growth of non-nitrogen fixing bacteria and the formation of excessive biomass.

The microorganisms useful in the invention are free living or non-symbiotic, aerobic nitrogen fixers typified by the genus Azotobacter and the species *A. chroococcum*, e.g. ATCC 9043, *A. vinelandii*, e.g. strain "O" from the University of Wisconsin, *A. indicus*, *A. lacticogenes*, and *A. beijerinckii*, including acid tolerant variants of the latter, sometimes considered as separate species denominated *Azotobacter beijerinckii*, var. acido-tolerans (Tehan) or *Azotobacter insigne* (Derx) or *Azotobacter macrocytogenes* (Jensen). See Voets and Dedeken "A Physiological Approach to the Classification of the Genus Azotobacter," Internat. Congr. Microbiol. Symp. 9, 103 (1966) and Skerman "Guide to Identification of the Genera of Bacteria," Williams and Wilkins Co., Baltimore, Md. (1967), pp. 140–141. It has also been proposed to split the original genus Azotobacter in two genera Azotobacter and Beijerinckii. See Voets and Dedeken, supra, and Jensen, H.L. 1954. "The Azotobacteriaceae" Bacteriol. Rev. 18, 195 (1954).

The microorganisms useful in this invention are not determined by the nuances of taxonomy, and include generally the aforementioned aerobic nonsymbiotic nitrogen fixers. *A. vinelandii* utilizes glucoses, benzoates and acetates as carbon sources; *A. chroococcum* utilizes starch; more highly acid wastes are appropriately processed in systems utilizing *A. beijerinckii*. Mixtures of types or species of nitrogen-fixing microorganisms are appropriately utilized for the processing of waste containing a variety of oxidizable compounds, for example a mixture of *A. vinelandii* and *A. beijerinckii* to process an acidic waste containing glucose. The nitrogen fixing microorganisms are utilized in the form of pure or semipure cultures containing at least about 75 weight percent and preferably more than 90 weight percent of cells.

The aerated zone should contain at least 0.01 atmosphere and preferably from about 0.15 to 0.21 atmosphere of dissolved oxygen, the latter value corresponding to the saturation of liquor with air. At oxygen concentrations in excess of 0.6 atmosphere the bacteria do not grow. Oxygen may be introduced, preferably at the bottom of a tank defining the aerated zone, in any desired form, including air and oxygen-enriched air.

The aerated zone is appropriately maintained at a pH within the range of from about 6 to about 9, preferably within the range of from about 7 to about 8.5 and at a temperature between 20° and about 40°C., preferably at about 30°C. *A. indicus* and *A. lacticogenes* are more effective at temperatures of 35°C. to 40°C..

The need for mineral nutrients such as phosphate, magnesium, calcium, potassium, sulfur and iron, in concentrations requisite to the proper growth of the microorganisms utilized, is common to all processes that depend upon active biomass formation in secondary waste treatments. Similarly such nutrients must either be present in the waste material treated in accordance with this invention, or added in concentrations as will be understood by those skilled in the art. Optimum operation of the process of this invention requires that the calcium level be elevated above that normally considered adequate in prior art activated sludge processes. For the genus Azotobacter an appropriate concentration is from 5 to 6 parts per million of calcium ion in systems containing 300 to 600 mg dry weight of cells per liter. Lesser amounts of calcium are required with weaker wastes which result in smaller quantities of volatile suspended solids or biomass.

Molybdenum or vanadium, not normally added in activated sludge and trickling filter systems, is required in trace amounts of at least about 0.01 ppm and preferably from about 0.1 to 0.2 ppm for the successful practice of the invention. The optimum amount of molybdenum or vanadium is a function of the quantity of biomass in the aerated zone and may readily be determined by routine test procedures.

Consistent with adequate removal of dissolved organic matter optimum operation is achieved if the detention time of the waste and the biomass formed in the aerated zone is preferably as short as possible to avoid leakage of nitrogen compounds from the cells of the nitrogen fixing microorganisms utilized and concomitant growth of undesirable bacteria. Accordingly, the retention time for the aqueous waste and the suspended biomass in the aerated zone should be from about 3 to about 12 hours. Higher retention times are necessary at lower temperatures or with carbon sources which are not readily assimilable. At a detention time of less than 3 hours the Azotobacter has been washed out of the treating zone. A preferred time is 4 to 6 hours at 30°C..

Although batch operation is contemplated, the invention is preferably practiced on a continuous basis, wherein the retention times specified are mean retention times in the aerated zone. In a preferred embodiment waste is continually introduced into and effluent is continuously withdrawn from near the top of the aerated zone.

Although a basic feature of the invention is to minimize the formation of biomass, it is often desirable to separate cells from the effluent. This separation can be easily achieved by conventional techniques, for example, flocculation or centrifuging. For example flocculation of cells is induced by the presence of from about 10 to 25 ppm of a polymeric flocculating agent such as a polyamine. Primafloc C-7 a polyamine manufactured by Rohm and Haas Co. is representative. At levels of 25 ppm the Azotobacter cell flocs formed in the presence of Primafloc C-7 were large enough to settle rapidly leaving a substantially clear effluent. The separated cells may provide a source of proteins for animal feed, vitamins, polymer gums, enzymes, etc. The feasibility of cell recovery will be dictated by the economics of the individual processes and the local markets. Recycle of some or all of the culture while not precluded is not recommended because old cells tend to be damaged and disintegrate releasing protein which is undesirable.

In the following examples the aerobic reactor described comprises an open beaker which was agitated with a laboratory Vibromixer having a 4 cm. diameter impeller (Chemapec Co., Hoboken, N.J.). Air was introduced into the reactor through a hollow shaft in the mixer. Each example illustrates a continuous steady state process. Thus the feed rate of the waste into the reactor is equal to the withdrawal rate of the effluent. During operation the reactor was maintained at a temperature of 30°C. and the contents of the reactor were maintained at a volume of 900 ml.

Throughout the examples reference to the standard concentration of nutrient salts defines the following composition:

| | |
|---|---|
| $K_2HPO_4$ | 1.0 gm/liter |
| $MgSO_4 \cdot 7H_2O$ | 0.20 gm/liter |
| $CaCl_2 \cdot 2H_2O$ | 0.02 gm/liter |
| $FeSO_4 \cdot 7H_2O$ | 5 mg/liter |
| $Na_2MoO_4 \cdot 2H_2O$ | 0.25 mg/liter |

EXAMPLE I

A shake-flask culture (150 ml in a 1-liter flask) of *Azotobacter chroococcum*, ATCC 9043, grown on nutrient salts-mannitol (Hexahydric alcohol) medium was inoculated into the reactor containing 750 ml of distilled water and 3.28 gm mannitol plus the standard concentration of nutrient salts. Air was introduced at a rate of 500 ml per minute. Culture growth was established in this reactor after about 12 hours. A synthetic waste containing the standard concentration of nutrient salts and 4.37 gm mannitol per liter was continuously fed to the reactor at a rate which resulted in a mean detention time 8.8 hours. The pH was not controlled but the waste was fed at pH 7.6, and no change occurred during the run.

After 18 hours of continuous flow operation, when steady state had been achieved, the feed and effluent streams were analyzed by standard COD procedures. The clear feed contained 4850 ppm of COD whereas the turbid effluent contained only 600 ppm of COD, an overall reduction of 87.7 percent. The effluent contained 0.43 gm of dry volatile solids (biomass) per liter. When the effluent was centrifuged to remove the suspended bacterial cells, the clear supernate contained only 185 ppm of COD.

EXAMPLE II

A shake flask culture prepared with nutrient salts and 0.2 percent sodium benzoate using *Azotobacter vinelandii O* sometimes referred to as *A. agilis*, equivalent to ATCC 13705 was inoculated into an aerobic reactor. The reactor contained 750 ml of distilled water containing 0.5 percent sodium benzoate and the standard concentration of nutrient salts which was modified to contain 0.15 gm per liter of Mg $SO_4\cdot 7H_2O$ instead of 0.20 gm/liter (this difference is not critical). After 12 hours, a continuous stream containing 0.5 percent sodium benzoate and nutrient salts present in the modified standard concentration were introduced at a rate of 2.38 ml/min to give a mean detention time of 6.25 hours.

After 17 hours, when steady state had been established, the feed and effluent streams were analyzed for benzoate using U.V. optical absorbance at 227 m$\mu$. The turbid effluent contained a negligible amount of free benzoate (<0.002 percent) in solution. The dry weight of biomass amounted to 550 mg/liter, corresponding to an 11 percent yield on the sodium benzoate. The pH of the effluent was 8.0. For such a strong waste (theoretical COD equivalent of 0.5 percent sodium benzoate is 8,600 ppm) it was necessary to use a mixture of air and tank oxygen (830 ml/min air; 300 ml/min $O_2$) to get a level of dissolved oxygen equivalent to 0.06 atm (as measured by a Beckman dissolved-oxygen probe).

When the air was further enriched with oxygen, (600 ml/min air; 600 ml/min $O_2$), the level of dissolved oxygen rose to 0.18 atm. The flow rate of waste and strength of the waste were the same as before. The pH was 7.65. After a new steady state had been established (24 hours) the turbid effluent contained a negligible amount of free benzoate (<0.002 percent) but the dry weight of biomass had dropped to 300 mg/liter, corresponding to a 6 percent yield on the sodium benzoate.

This run was continued for 26 days without infection thus demonstrating the stability of the system.

EXAMPLE III

The process of Example II was continued by changing the composition of the synthetic waste from 0.5 percent sodium benzoate to 0.35 percent glucose and $CaCl_2\cdot 2H_2O$ level from 0.02 to 0.06 gm/liter. The 900 ml liquor volume was aerated with 830 ml air/min. At a flow corresponding to a mean detention time of 9.5 hours, an effluent pH of 7.0, and dissolved oxygen equivalent to 0.105 atm, the free glucose remaining in solution in the turbid effluent was less than 0.005 percent (Somogyi-Nelson analysis for reducing sugars). The dry weight of biomass in the effluent amounted to 295 mg/liter.

The flow rate of the waste was then increased to give a mean detention time of only 5.6 hours. All other operating conditions were held the same but the pH which was uncontrolled shifted to 7.3. After 22 hours, analysis showed that free glucose in the effluent was still less than 0.005 percent. The dissolved oxygen, however, dropped to 0.06 atm (this is because more glucose was being oxidized per unit time at the higher feed rate). As a consequence of the lower dissolved oxygen, the dry weight of biomass in the effluent increased from 295 mg/liter to 515 mg/liter. The corresponding yields of biomass on glucose consumed were 8.44 percent and 14.7 percent.

This example illustrates the ability of the process to respond to sudden changes in loading conditions.

EXAMPLE IV

An aerobic reactor containing a culture of *Azotobacter vinelandii O* as used in Example II, was oxidizing an ethanol-containing synthetic waste (0.15 percent ethanol plus standard concentrations of nutrient salts). The feed composition was then changed so as to contain, instead of the ethanol 0.465% $NaC_2H_3O_2\cdot 3$ $H_2O$ (sodium acetate) containing the standard nutrient composition at a pH of 7.8. Without any period of adaptation, the Azotobacter began to oxidize the acetate, so that the pH rose to 8.7. The reactor was aerated with 200 ml/min. of air and flow of the waste was set to give a mean detention time of 6.2 hours. After 24 hours, the measured level of dissolved oxygen was equivalent to 0.09 atm, and measured COD values were: clear feed, 1,900 ppm; turbid effluent, 190 ppm (90 percent removal). The effluent contained 175 mg dry weight of biomass per liter. The clear supernate from centrifuged effluent showed 0 ppm of COD.* (* The literature states that COD determinations on acetate are always somewhat low. Thus the calculated oxygen demand of the feed stream should be 2180 ppm, whereas the assay showed only 1900 ppm.)

The phosphate concentration of the mineral salts in the synthetic waste was reduced from 1 gm per liter of the dibasic salt to 90 mg per liter of monobasic salt ($KH_2PO_4$), and the concentration of sodium acetate was increased from a calculated 2,180 ppm COD to 3000 ppm COD. These new conditions corresponded to a COD/P ratio of 150/1. No significant changes in the process were observed over a period of four days at this reduced phosphate level.

EXAMPLES V – VIII

These examples illustrate the treatment of other materials by the disclosed process. The results were determined under steady state operation of the standard reactor using a culture of *A. vinelandii O* and a waste containing the standard nutrient composition. The partial pressure of oxygen was between 0.06 and 0.075 atm and the detention times were from 4–6 hours.

In example 5 it was necessary to acclimate the culture to phenol starting from a feed containing sodium benzoate. Respiratory adaption occurred in about 2 hours and after feeding a mixture of phenol and benzoate overnight the culture was fully acclimated to straight phenol.

Examples 6 and 8 illustrate the treatment of mixtures of carbonaceous organic matter by the process of the invention.

The following example illustrates the ability of the disclosed process to treat aldehyde-containing wastes:

| Example | Synthetic waste | COD of waste, p.p.m. | COD, turbid effluent, p.p.m. | Effluent pH | COD removed, percent | COD, clear supernate after centrifuging, percent | Clarified COD removed, percent |
|---|---|---|---|---|---|---|---|
| 5 | 0.84 gm./liter of phenol | 1,870 | 262 | 7.2 | 86 | 10 | 99.5 |
| 6 | 0.93 gm./liter of sodium benzoate [1] | 2,900 | 365 | 7.5 | 87 | 15 | 99.4 |
| 7 | 1.5 gm./liter of ethanol | 3,000 | 560 | 7.1 | 81 | 35 | 98.8 |
| 8 | 1.4 gm./liter of acetic acid [2] | 2,720 | 375 | 8.0 | 86 | nil | |

[1] Plus 0.64 gm./liter of phenol.
[2] Plus 1.58 gm./liter of succinic acid (brought to pH 5.0 with NaOH).

EXAMPLE IX

The feed of a standard aerobic reactor having an active culture of *A. vinelandii O* which was treating an acetic acid waste having a COD of 3,000 ppm was altered to consist of 1.44 gm/liter of acetic acid and 0.825 gm/liter acetaldehyde. The pH of the synthetic waste was adjusted to 4.7 with sodium hydroxide. After 19 hours of operation when steady state had been attained the reactor pH was 7.9, the partial pressure of oxygen was 0.13 atm and the air feed rate was 340 ml air/min. The aldehyde-containing feed also included the standard nutrient salts composition and was supplied to the reactor at a rate to produce a mean detention time of 6.7 hours.

The COD of the feed was 2,100 ppm and the turbid effluent had a COD of 160 ppm, a 92 percent removal. The dry weight of the biomass in the turbid effluent was 156 mg/liter. After removal of the biomass by centrifuging the clear supernate had a COD of 5 ppm which is 99.7 percent removal.

EXAMPLE X

Apple juice diluted with water (COD 5200 ppm) was fed to an aerobic reactor containing *A. vinelandii O* at a rate to obtain a retention time of 4½ hours. After 30 hours the effluent contained 1,078 ppm COD, a 79 percent reduction. The clear liquid and the biomass contained 508 ppm and 570 ppm, COD, respectively.

According to Lange's Handbook of Chemistry apple juice normally contains 15 percent sugars and 0.3 percent protein. The juice thus contains a 50/1 ratio of carbohydrate to protein. Assuming protein is 16 percent nitrogen the COD/N ratio is approximately 310/1. This contrasts with the 20/1 to 30/1 ratio of COD normally considered necessary for biomass formation.

While all of the above examples utilize a single stage reactor, the process is also applicable to treatment in a plurality of reaction zones.

Multiple reactors are often desirable to achieve efficient process operation, for example to obtain maximum utilization of oxygen when using oxygen enriched air for aeration.

The use of more than one reactor is also indicated when "catabolite repression" or "inhibition" occurs. This phenomenon may occur when mixtures of carbonaceous organic matter particularly mixtures containing glucose are treated. In such cases the culture breaks down the constituents of the feed sequentially instead of simultaneously, that is, one component of the waste is substantially removed before oxidation of another of the components begins. In order to achieve removal of all waste constituents it is appropriate to remove the interfering substance in a first aerated zone, and the remaining substances in one or more subsequent aerated zones.

What is claimed is:

1. A process for the biooxidation of nitrogen-deficient aqueous organic waste comprising
    feeding said waste material into an aerated zone, said zone containing
    a. an active culture comprising at least 75 percent by weight of cells of aerobic, free-living nitrogen fixing microorganisms
    b. a sufficient amount of nutrients to maintain growth of said cells, including at least approximately 0.01 ppm of molybdenum or vanadium, and
    c. at least 0.01 atmospheres of dissolved oxygen, said zone being maintained at
    a. a temperature of from about 20°C. to about 40°C. and
    b. a pH of from about 6 to about 9, and
    removing the effluent including the suspended biomass from said zone after a retention time of from about 3 to about 12 hours.

2. A process according to claim 1 wherein said waste has a nitrogen to BOD ratio less than 1:20.

3. A process according to claim 2 wherein said waste has a nitrogen to BOD ratio of from about 1:30 to about 1:35.

4. A process according to claim 1 wherein said aerated zone contains from about 0.15 to about 0.21 atmospheres of dissolved oxygen.

5. A process according to claim 1 wherein said aerated zone is maintained at a pH of from about 7 to about 8.5.

6. A process according to claim 1 wherein said aerated zone is maintained at a temperature of approximately 30°C.

7. A process according to claim 1 wherein said aerated zone is maintained at a temperature of from about 35°C. to about 40°C.

8. A process as defined in claim 1 practiced on a continuous basis, said waste being introduced into said aerated zone and said effluent being removed from said aerated zone at rates requisite to afford a mean detention time of said waste in said zone of from about 3 to about 12 hours.

9. A process as defined in claim 8 wherein said mean detention time is from about 4 to about 6 hours.

10. A process as defined in claim 8 wherein said active culture comprising about 75 percent by weight of cells of microorganisms selected from the group consisting of *azotobacter chroococcum, azotobacter vinelandii, azotobacter indicus, azotobacter lacticogenes, azotobacter beijerinckii*, acid tolerant variants of the latter, and mixtures thereof.

11. A process as defined in claim 10 wherein said microorganism is *azotobacter vinelandii*.

12. A process as defined in claim 10 wherein said microorganism is *azotobacter Chroococcum*.

13. A process for the biooxidation of nitrogen-deficient aqueous organic waste having a nitrogen to BOD ratio of less than 1:20 comprising
continuously feeding said waste material into an aerated zone containing
 a. an active culture comprising at least 75 percent by weight of cells of microorganisms selected from the group consisting of *azotobacter chroococcum, azotobacter vinelandii, azotobacter indicus, azotobacter lacticogenes, azotobacter beijerinckii*, acid tolerant variants of the latter, and mixtures thereof,
 b. a sufficient amount of nutrients to maintain growth of said cells, including at least approximately 0.01 ppm of molybdenum or vanadium, and
 c. from about 0.15 to about 0.21 atmospheres of dissolved oxygen,
said zone being maintained at
 a. a temperature of about 30°C. to about 38°C. and
 b. a pH of from about 7 to about 8.5 continuously discharging an effluent of treated waste and suspended biomass from said zone, the mean detention time of said waste in said zone being in the range of from about three to about 12 hours to remove at least about 80 percent of the COD of the original waste material.

14. A process as defined in claim 13 wherein the effluent is further processed to remove the biomass and provide a clear supernate of liquor.

15. The process as defined in claim 14 wherein the biomass is separated by flocculation.

16. The process as defined by claim 14 wherein in the clear supernate is characterized by a BOD of no greater than about 1.2 percent of the initial BOD of the waste.

17. A process as defined in claim 1 wherein the effluent is further processed to remove the biomass and provide a clear supernate liquor.

18. The process as defined in claim 17 wherein the biomass is separated by flocculation.

19. The process as defined in claim 18 wherein the clear supernate is characterized by a BOD of no greater than about 1.2 percent of the initial BOD of the waste.

* * * * *